(12) United States Patent
Tani

(10) Patent No.: US 10,721,387 B2
(45) Date of Patent: Jul. 21, 2020

(54) LENS DRIVING APPARATUS AND LENS DRIVING METHOD

(71) Applicant: OLYMPUS CORPORATION, Hachioji-shi, Tokyo (JP)

(72) Inventor: Naoaki Tani, Hachioji (JP)

(73) Assignee: Olympus Corporation, Tokyo (JP)

( * ) Notice: Subject to any disclaimer, the term of this patent is extended or adjusted under 35 U.S.C. 154(b) by 483 days.

(21) Appl. No.: 15/411,688

(22) Filed: Jan. 20, 2017

(65) Prior Publication Data

US 2017/0223257 A1 Aug. 3, 2017

(30) Foreign Application Priority Data

Jan. 28, 2016 (JP) .................................. 2016-014587

(51) Int. Cl.
*H04N 5/232* (2006.01)
*G02B 7/08* (2006.01)
(Continued)

(52) U.S. Cl.
CPC ............ *H04N 5/23212* (2013.01); *G02B 7/08* (2013.01); *G02B 7/09* (2013.01); *G02B 7/365* (2013.01); *H04N 5/23293* (2013.01)

(58) Field of Classification Search
CPC .......... G02B 7/08; G02B 27/646; G02B 7/09; G02B 7/04; G02B 7/102; G02B 7/28; G02B 7/023; G02B 7/021; G02B 7/10; G02B 13/001; G02B 13/02; G02B 7/02; G02B 13/16; G02B 15/14; G02B 3/14; G02B 7/282; G02B 13/0045; G02B 27/0006; G02B 5/208; G02B 7/028; H04N 5/2254; H04N 5/2253; H04N 5/2257;
(Continued)

(56) References Cited

U.S. PATENT DOCUMENTS

2004/0240507 A1* 12/2004 Govorkov ............. H01S 3/0977
372/55
2012/0050897 A1* 3/2012 Akada ....................... H02P 6/16
359/824
(Continued)

FOREIGN PATENT DOCUMENTS

JP 2001-178193 6/2001

OTHER PUBLICATIONS

Office Action to corresponding Chinese Patent Application Serial No. 201710057332.7, dated Feb. 12, 2019 (6 pgs.).

*Primary Examiner* — William R Alexander
*Assistant Examiner* — Sharrief I Broome
(74) *Attorney, Agent, or Firm* — John C. Pokotylo; Pokotylo Patent Services

(57) ABSTRACT

A lens driving apparatus comprising: a stepping motor for driving a lens; a rotation detection sensor for detecting a rotation position of the stepping motor; and a controller which is capable of switching between open-loop control that performs position instruction in accordance with a predetermined pattern and closed-loop control that performs position instruction on the basis of follow-up delay, changes and accelerates the velocity for advancing the position of the stepping motor on the basis of a fixed velocity pattern by open-loop control when the lens starts moving, and transitions to the closed-loop control upon the velocity corresponding to the velocity pattern reaching a predetermined value.

14 Claims, 11 Drawing Sheets

(51) Int. Cl.
    *G02B 7/09* (2006.01)
    *G02B 7/36* (2006.01)

(58) Field of Classification Search
    CPC ........... H04N 5/23212; H04N 5/23287; H04N
        5/232; H04N 5/2252; H04N 5/23296;
        H04N 5/225; H04N 5/2258; H04N
        5/23229; H04N 5/23293; H04N 17/002;
        H04N 5/23203; H04N 5/23209; H04N
        5/23219; H04N 5/23245; H04N 5/23258;
        H04N 5/2328; H04N 5/2251; G03B 5/00;
        G03B 3/10; G03B 2205/0069; G03B
        13/36; G03B 2205/0007; G03B
        2205/0015; G03B 11/00; G03B 13/34;
        G03B 2205/0046; G03B 5/02; G03B
        17/02; G03B 17/14; G03B 5/04; G03B
        2205/0053; G03B 2205/0092; G03B
        43/00; G03B 15/00; G03B 15/006; G03B
        17/00; G03B 17/08
    See application file for complete search history.

(56) References Cited

U.S. PATENT DOCUMENTS

| | | | |
|---|---|---|---|
| 2017/0019601 A1* | 1/2017 | Sumioka | H04N 5/23296 |
| 2017/0163191 A1* | 6/2017 | Mizuo | H02P 8/36 |
| 2017/0244901 A1* | 8/2017 | Wada | H04N 5/23212 |
| 2018/0007267 A1* | 1/2018 | Ohtsuka | H04R 3/00 |
| 2018/0035064 A1* | 2/2018 | Hoshina | H04N 5/23245 |

\* cited by examiner

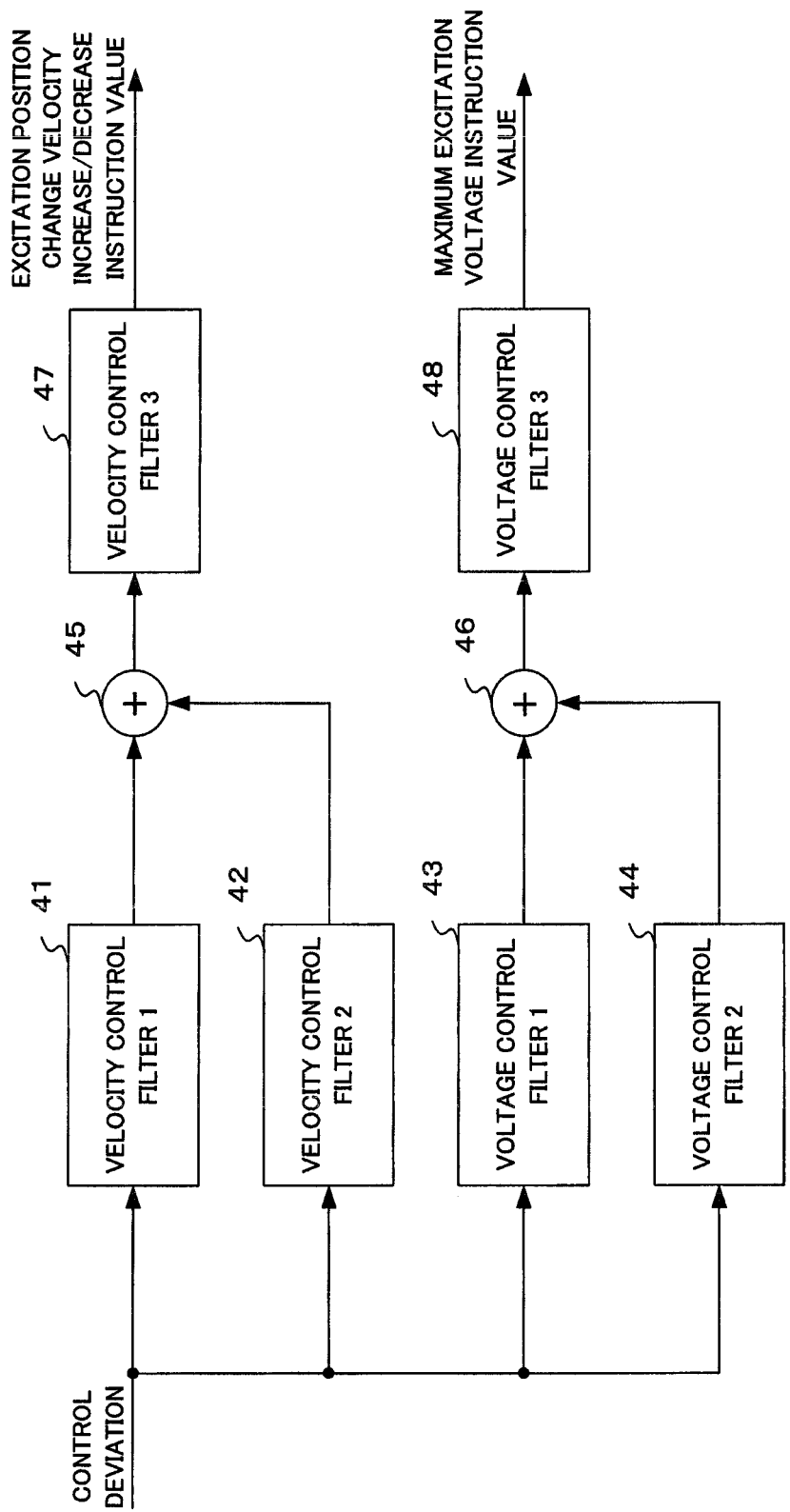

LENS DRIVING APPARATUS AND LENS DRIVING METHOD

CROSS-REFERENCE TO RELATED APPLICATIONS

Benefit is claimed, under 35 U.S.C. § 119, to the filing date of prior Japanese Patent Application No. 2016-014587 filed on Jan. 28, 2016. This application is expressly incorporated herein by reference. The scope of the present invention is not limited to any requirements of the specific embodiments described in the application.

BACKGROUND OF THE INVENTION

1. Field of the Invention

The present invention relates to a lens driving apparatus and a lens driving method in a lens-integrated imaging device, a lens-interchangeable imaging device and the like.

2. Description of Related Art

There is a demand for a faster and higher-precision autofocusing along with the increase in velocity and number of pixels of image sensors in imaging devices such as digital cameras. In addition, there is arising a demand for characteristic lenses such as large-diameter and bright lenses, telephoto lenses with long focal lengths, and macro lenses with high-photographing magnifications. Therefore, a driving apparatus of a focus lens is required to move a large and heavy lens, or move the lens quickly over a long stroke, for example.

A stepping motor is often used to drive a focus lens in terms of cost and size. There may occur a phenomenon called step-out, in which the velocity of the stepping motor is too fast relative to the load. Occurrence of a step-out may result in a gap between an instructed position and an actual position, and therefore the maximum velocity is determined so as to secure a sufficient safety factor relative to loads assumed in design.

Attempting to secure a sufficient safety factor in consideration of step-out may fail to exert the highest performance of the stepping motor and therefore is inefficient. Accordingly, Japanese Patent Laid-Open No. 2001-178193 (hereafter referred to as "Patent Literature 1") has proposed a method of attaching a sensor to a stepping motor, constantly detecting the rotation position of the stepping motor, performing feedback control so that the difference from a motor position command signal becomes zero, and exerting the maximum performance of the stepping motor.

The lens driving apparatus disclosed in Patent Literature 1 performs feedback control, i.e., constant feedback control, of the stepping motor from activation thereof. Performing constant feedback control may lead to an abrupt control of velocity or rotational direction of the motor in an attempt to cancel a temporary increase of the difference between the current position and the motor position command signal caused by a delay of the follow-up of load relative to the rising of a position command signal of the motor due to static friction or inertia. Accordingly, there may occur an excessive decrease of velocity or a temporary reverse phenomenon that may result in unstable feedback control, thereby preventing smooth and quick start of operation. Furthermore, there have been drawbacks such as: taking a long time before reaching a target position located also at a relatively short distance; taking a long time before reaching a target velocity; taking a long time for autofocusing; or generating a noise due to unstable driving.

SUMMARY OF THE INVENTION

It is an object of the present invention to provide a lens driving apparatus and a lens driving method that prevent driving of a lens from becoming unstable when the lens starts moving.

A lens driving apparatus according to a first aspect of the present invention is an apparatus comprising: a stepping motor for driving a lens; a rotation detection sensor for detecting a rotation position of the stepping motor; and a controller for instructing a rotation position of the stepping motor, and also calculating a follow-up delay on the basis of a difference between position detection information detected by the rotation detection sensor and information of the instructed rotation position, wherein the controller, which is capable of switching between open-loop control that performs position instruction in accordance with a predetermined pattern and closed-loop control that performs position instruction on the basis of the follow-up delay, changes and accelerates a velocity for advancing the position of the stepping motor on the basis of a fixed velocity pattern by the open-loop control when the lens starts moving, and transitions to the closed-loop control upon the velocity corresponding to the velocity pattern reaching a predetermined value.

A lens driving method according to a second aspect of the present invention is a lens driving method of a lens driving apparatus having a stepping motor for driving a lens and a rotation detection sensor for detecting a rotation position of the stepping motor, the method comprising: instructing a rotation position of the stepping motor; calculating a follow-up delay on the basis of a difference between position detection information detected by the rotation detection sensor and information of the instructed position; allowing, when instructing the rotation position, switching between open-loop control that performs position instruction in accordance with a predetermined pattern and closed-loop control that performs position instruction on the basis of the follow-up delay; changing and accelerating a velocity for advancing the position of the stepping motor on the basis of a fixed velocity pattern by the open-loop control when the lens starts moving; and transitioning to the closed-loop control upon the velocity corresponding to the velocity pattern reaching a predetermined value.

BRIEF DESCRIPTION OF THE DRAWINGS

FIG. 6 is a block diagram illustrating a configuration of a phase compensation filter of a camera according to an embodiment of the present invention.

FIGS. 8A to 8C are explanatory graphs of driving control when using a conventional stepping motor, wherein FIG. 8A is a graph illustrating an operation during constant-velocity driving without feedback control, FIG. 8B is a graph illustrating a behavior during acceleration driving without feedback control, and FIG. 8C is a graph illustrating a behavior with feedback control being performed from the start of driving.

DETAILED DESCRIPTION OF THE PREFERRED EMBODIMENTS

In the following, an exemplary application to a digital camera will be described as an embodiment of the present invention. The camera converts a subject image formed by an optical lens within a lens barrel section, into image data by an imaging section, performs, on the basis of the converted image data, live-view display of the subject image on a display section provided on the back side of the main body, and stores image data of still images or video images on a storage medium. In coordination with a half-pressing operation of a release button, or the like, the camera performs focus detection using a contrast method, a phase difference method, or the like, and moves the optical lens to a focusing position by driving the stepping motor in accordance with the result of focus detection.

Figure 5A:
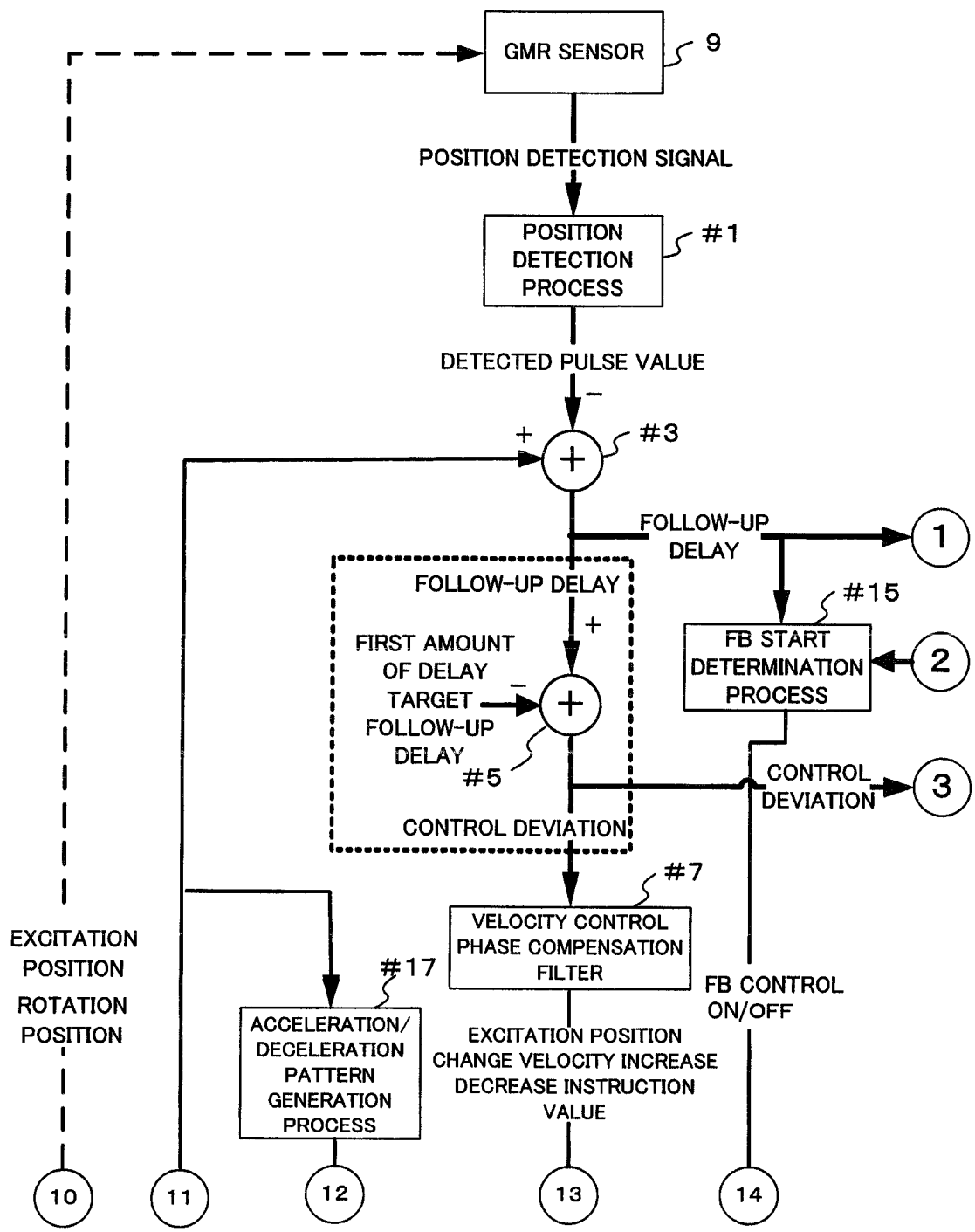
FIGS. 5A to 5C are explanatory diagrams of a feedback control loop of a camera according to an embodiment of the present invention.
Figure 7:
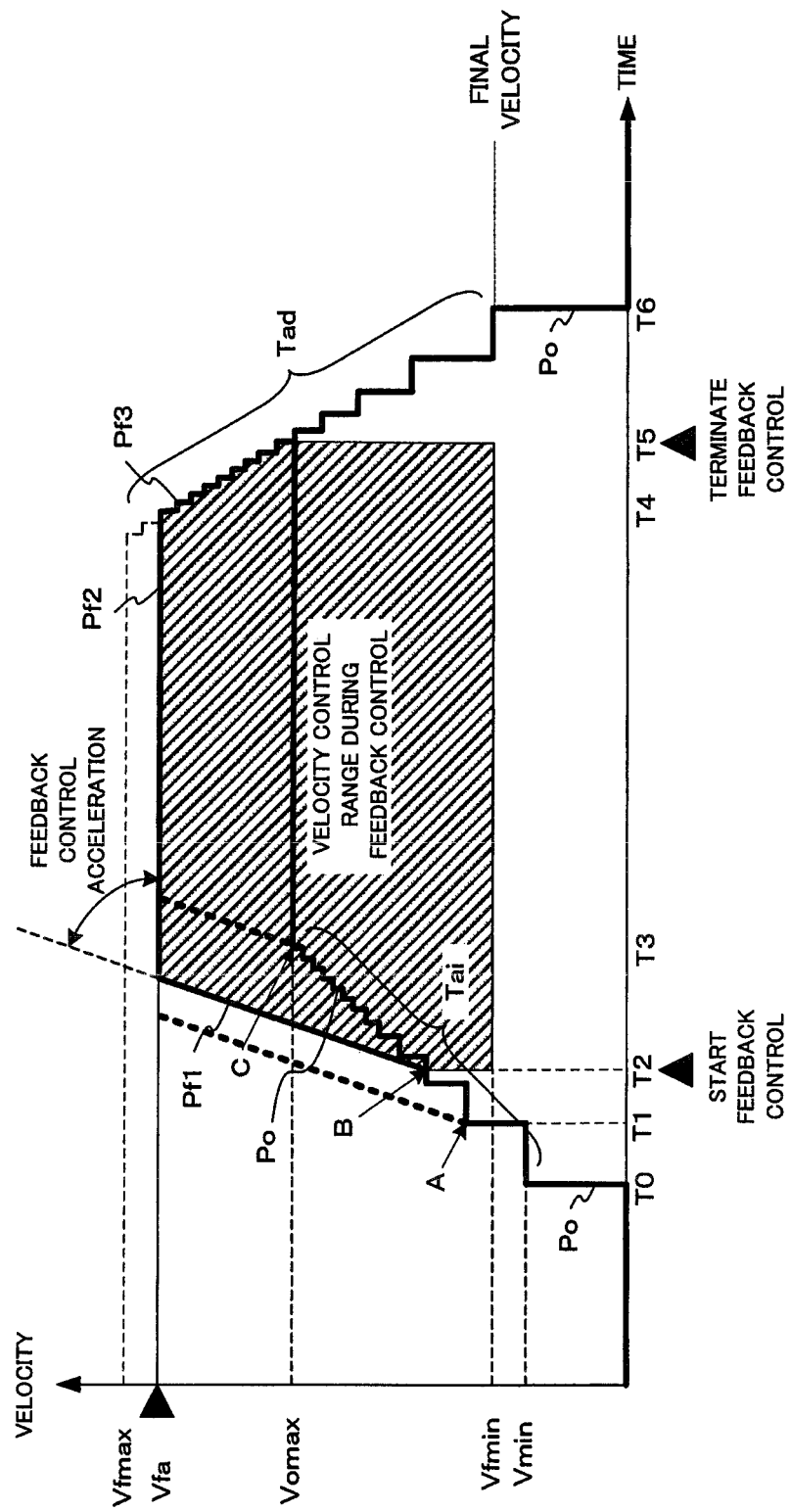
FIG. 7 illustrates a velocity profile from a start to end of driving in a camera according to an embodiment of the present invention.

When moving the optical lens to the focusing position, the camera performs driving of the stepping motor by open-loop control (also referred to as "open control") with a predetermined pattern at the start of driving, and performs driving of the stepping motor by closed-loop control (also referred to as "feedback control"), when a predetermined condition such as the driving velocity having reached a predetermined value is satisfied (see, for example, the FB start determination process of FIG. 5A, or the feedback control start time point T2 of FIG. 7).

Figure 1:
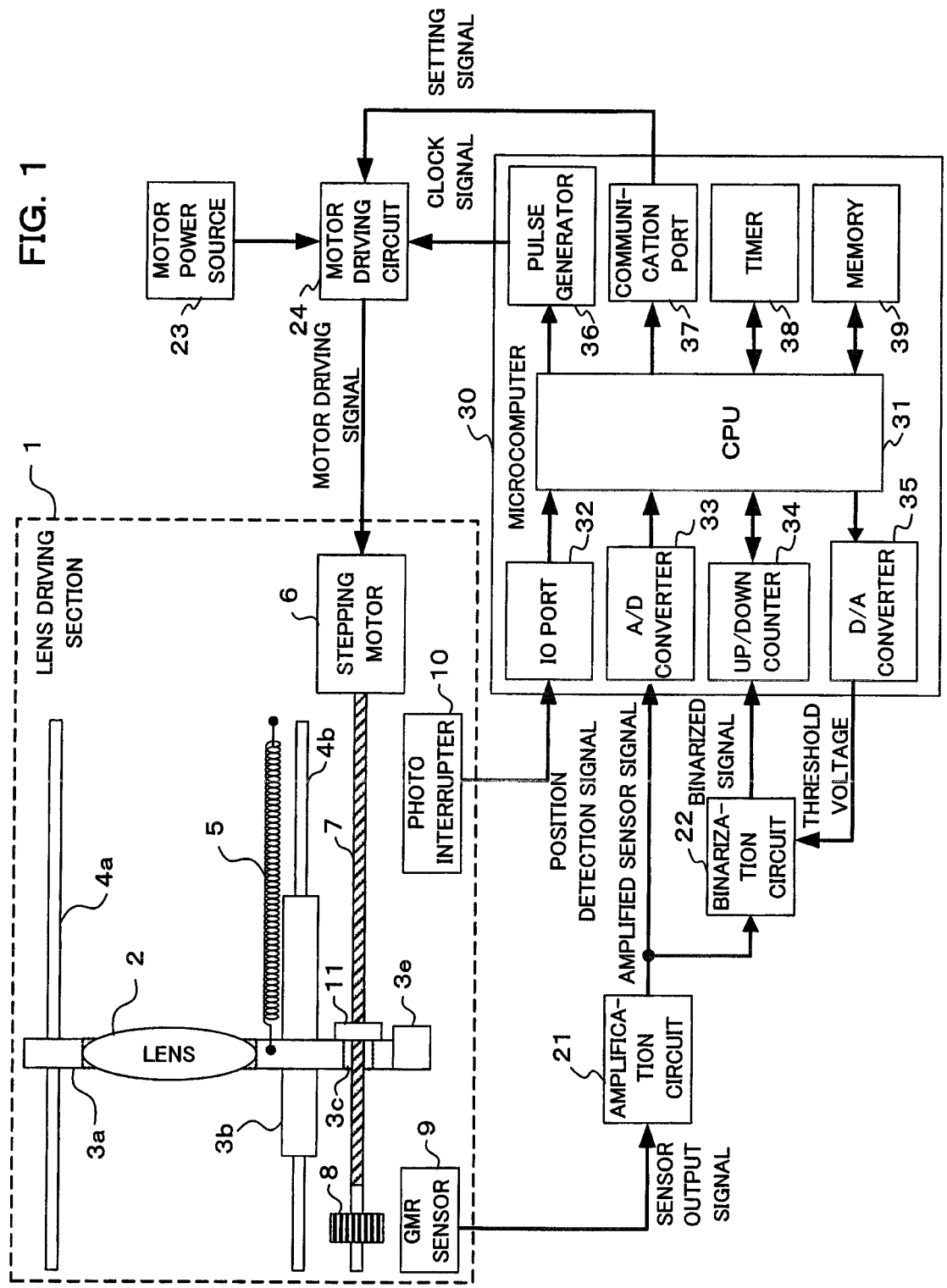
FIG. 1 is a block diagram illustrating a configuration of a camera according to an embodiment of the present invention.

In the following, a preferred embodiment will be described with regard to a camera to which the present invention is applied, referring to the drawings. FIG. 1 is a block diagram illustrating a mechanical configuration of a lens driving section of a camera according to an embodiment of the present invention, and mainly an electric configuration relating to lens driving of the camera.

A lens driving section 1 is provided within an interchangeable lens of a lens-integrated camera or a lens-interchangeable camera. There are provided, within the lens driving section 1, an optical lens (referred to as "lens" for short, in the following) 2, a lens frame 3, guide shafts 4a and 4b, a spring 5, a stepping motor 6, a lead screw 7, a scale magnet 8, a GMR (Giant Magneto Resistive Effect) sensor 9, and a photo interrupter 10.

The lens 2 has one or more optical lenses and forms a subject image. The lens 2 is held by the lens frame 3. The guide shafts 4a and 4b extend along an optical axis direction of the lens 2 and are fixed to a lens mirror frame or the like. The spring 5, which is a tension spring provided between the lens frame 3 and a fixing member of the lens mirror frame, provides the lens frame 3 with biasing force rightward in the drawing.

The lens frame 3 described above has a fixing section 3a extending orthogonally to the optical axis direction of the lens 2, and an fitting section 3b which is integrated with the fixing section 3a and fitted with the guide shaft 4b. In addition, the lens frame 3 has a through-hole 3c through which the lead screw 7 penetrates, and alight shielding blade 3e. The light shielding blade 3e is integrated with the fixing section 3a and provided on one end side of the fixing section 3a. As will be described below, the light shielding blade 3e shields light emitted from a light emitting section of the photo interrupter 10 when the lens 2 moves to a reference position.

The stepping motor 6 is rotationally driven upon receiving a two-phase pulse signal including phase A and phase B from a motor driving circuit (motor driver) 24 as a motor driving signal. The stepping motor 6 drives a lens. A rotary driving shaft of the stepping motor 6 is integrated with the lead screw 7. Accordingly, the lead screw 7 rotates forward or reverse in accordance with the motor driving signals applied to the stepping motor 6. Forward or reverse rotation of the lead screw 7 moves the lens 2 along the optical axis direction via a nut 11 engaged with the lead screw 7. The nut 11 is separate from the lens frame 3. The lens frame 3 is pulled rightward in FIG. 1 by the spring 5, whereby the periphery of the through-hole 3c is brought to abut against the nut 11 engaged with the lead screw 7. With a rotation stopper (not illustrated) of the nut 11 provided on the lens frame 3, rotation of the lead screw 7 moves the nut 11 rightward or leftward, and the lens frame 3 abutting thereto also moves in the optical axis direction.

The scale magnet 8, which is integrally provided on one end side of the lead screw 7, has S poles and N poles alternately magnetized along the circumferential surface thereof. The GMR sensor 9, which is provided at a position facing the scale magnet 8, outputs a two-phase signal in accordance with the magnetic field generated by the S and N poles of the scale magnet 8. The scale magnet 8 and the GMR sensor 9 allow detection of a relative rotation position of the stepping motor 6 (relative position of the lens 2 in the optical axis direction). The scale magnet 8 and the GMR sensor 9 function as a rotation detection sensor for detecting a rotation position of the stepping motor. Detection of a rotation position by the scale magnet 8 and the GMR sensor 9 will be described in detail, referring to FIG. 2.

The photo interrupter 10, which is fixed to a lens mirror frame or the like, has a light emitting section and a light-receiving section. When the lens 2 moves to a reference position, light emitted from the light emitting section is shielded by the light shielding blade 3e. When the light is shielded, the light-receiving section changes its output, and thereby can detect that the lens 2 is located at the reference position. In other words, the light shielding blade 3e and the photo interrupter 10 allow detection of the absolute position of the lens 2. A position detection signal from the photo interrupter 10 is output to an IO port 32.

As thus described, the lens driving section 1 according to the present embodiment moves the nut 11 rectilinearly by rotation of the lead screw 7 driven by the stepping motor 6, and moves the lens frame 3 along the guide shafts 4a and 4b. Accordingly, the lens 2 fixed to the lens frame 3 is driven in the optical axis direction. In addition, with a scale magnet 8 being attached to the tip of the lead screw 7 at a position facing the GMR sensor 9, forward or reverse rotation of the lead screw rotates the scale magnet 8 in the same direction.

The output of the GMR sensor 9 is connected to an amplification circuit 21. The amplification circuit 21 amplifies the two phases of the analog sensor output signal from the GMR sensor 9, respectively, and performs a noise removal process of the sensor signal. An amplified sensor signal processed in the amplification circuit 21 is output to an A/D converter 33 and a binarization circuit 22.

The binarization circuit 22 binarizes the two phases of the sensor output signal from the amplification circuit 21, respectively, and outputs the binarized signal to an up/down counter (two-phase counter) 34. When performing binarization, the binarization circuit 22 receives an input of a threshold voltage from a D/A converter 35 and performs the binarization using the threshold voltage.

A microcomputer 30, which has a CPU (Central Processing Unit) 31 and peripheral circuits thereof, controls the entire lens driving. Specifically, the microcomputer 30 generates various signals for driving the stepping motor 6 in accordance with various signals from the lens driving section 1, for example. There are provided, as peripheral circuits, an IO (Input/Output) port 32, the A/D (Analog/Digital) converter 33, the up/down counter 34, the D/A (Digital/Analog) converter 35, a pulse generator 36, a communication port 37, a timer 38, and a memory 39.

The IO port 32 receives an input of a position detection signal from the photo interrupter 10 and, on the basis of the position detection signal, outputs to the CPU 31 a signal indicating that the lens 2 is located at the reference position.

The A/D converter 33 receives an input of the amplified sensor signal including phase A and phase B from the amplification circuit 21, performs AD conversion on respective phases of the signal to convert the phase A and phase B of the amplified sensor signal into digital data, and outputs the digital data to the CPU 31.

The D/A converter 35 receives an input of a digital value corresponding to a threshold voltage from the CPU 31, converts the digital value into an analog voltage, and outputs the analog voltage to the binarization circuit 22 as the threshold voltage. A middle point potential of the amplified sensor signal has variation depending on the properties of the GMR sensor 9 or the amplification circuit 21, as will be described below, referring to FIG. 3. Accordingly, the middle point potential of phase A and phase B is preliminarily stored in the memory 39 as an adjustment value, and the binarization circuit 22 performs binarization using the middle point potential as a threshold voltage.

The up/down counter 34 receives an input of a binarized signal from the binarization circuit 22, and performs up/down counting. The GMR sensor 9, which outputs a sensor signal including phase A and phase B, performs up/down counting each time a binarized signal is input. Accordingly, it is possible to determine whether the scale magnet 8 is rotating forward or reverse, i.e., to which direction the lens 2 is moving.

The memory 39 has an electrically rewritable volatile memory (e.g., a DRAM (Dynamic Random Access Memory), or the like), and an electrically rewritable non-volatile memory (e.g., a flash ROM (Flash Read Only Memory), or the like). The memory 39 stores programs to be executed by the CPU 31, and various types of data such as various adjustment values of the lens (e.g., values relating to the middle point potential described above), and setting values for driving the lens.

The timer 38 performs a timing operation for generating control cycles of feedback control, or measuring the time taken by various operations of the lens. In addition, the timer 38 has a calendar function or the like. The communication port 37 is a port for exchanging signals with the outside of the CPU 31. In the present embodiment, various types of communication are performed via the communication port 37, such as, for example, transmission of setting signals from the communication port 37 to the motor driving circuit 24.

Upon receiving a control signal from the CPU 31, the pulse generator 36 generates a clock signal (pulse signal) to be output to the motor driving circuit 24 for driving the stepping motor 6. In other words, the pulse generator 36 outputs a clock signal to the motor driving circuit 24, and advances the excitation position of the stepping motor.

The motor driving circuit 24 receives supply of power source voltage from a motor power source 23, receives inputs of the clock signal from the pulse generator 36 and a setting signal from the communication port 37, and outputs a motor driving signal including a two-phase voltage signal to the stepping motor 6. In addition, the motor driving circuit 24, when outputting the motor driving signal, adjusts the maximum applied voltage of the motor driving signal, on the basis of a setting signal from the CPU 31. The motor power source 23 has a power source such as a battery, which is converted into a constant voltage by a constant voltage circuit or the like (not illustrated), and supplies power to the motor driving circuit 24.

When generating a motor driving signal, the CPU within the microcomputer 30 performs arithmetic operation on the basis of the sensor output signal detected by the GMR sensor 9, and performs management of the driving pulse output by the motor driving circuit 24, setting of driving velocity, setting of driving voltage, and various arithmetic operations of digital data required for feedback control.

In addition, the CPU 31 has a function as a controller and instructs a rotation position of the stepping motor and also calculates a follow-up delay on the basis of a difference between position detection information detected by the rotation detection sensor and information of the position instructed by a position instruction section (see, for example, the difference calculation process at #3 of FIG. 5A). The controller is capable of switching between open-loop control that performs position instruction in accordance with a predetermined pattern and closed-loop control that performs position instruction on the basis of the follow-up delay, changes and accelerates the velocity for advancing the position of the stepping motor on the basis of a fixed velocity pattern by the open-loop control when the lens starts moving, and transitions to the closed-loop control upon the velocity corresponding to the velocity pattern reaching a predetermined value.

Figure 2:
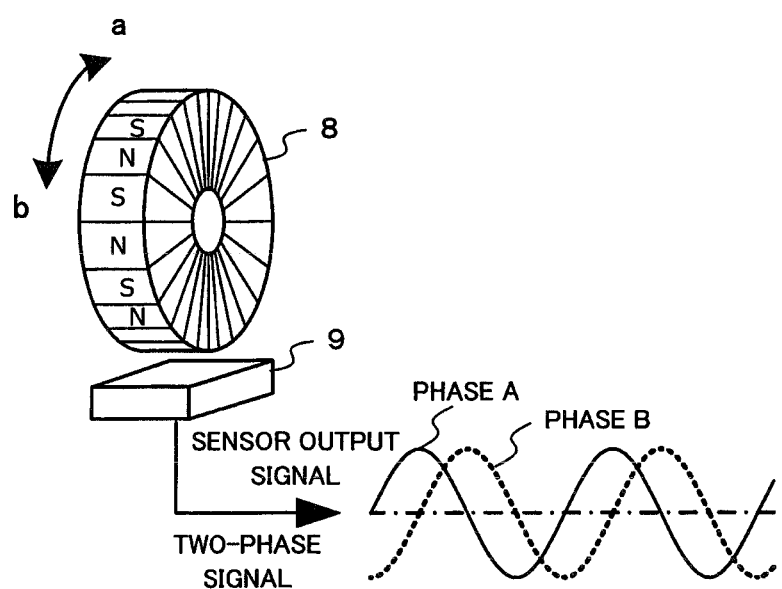
FIG. 2 is an explanatory diagram of rotation position detection by a GMR sensor of a camera according to an embodiment of the present invention.

Next, rotation detection by the scale magnet 8 in the present embodiment will be described, referring to FIG. 2. The cylindrical scale magnet 8 attached to the rotational shaft of the stepping motor 6 has N poles and S poles alternately magnetized repeatedly at a regular interval along the circumferential surface thereof. Rotation of the rotational shaft of the stepping motor 6 changes the position of the magnetic pole facing the GMR sensor 9. As a result, a sinusoidal signal including phase A and phase B with a phase difference of approximately 90 degrees is output from the GMR sensor 9, as a sensor output signal. When, for example, the scale magnet 8 rotates in a direction "a" in the drawing, a signal is obtained with a phase relationship such that phase B is advanced relative to phase A by 90 degrees as illustrated in FIG. 2, whereas when the scale magnet 8 rotates in a direction "b", a signal is obtained with a phase relationship such that phase B is behind phase A by 90 degrees.

Next, a pulse detection process will be described, referring to FIG. 3. The sinusoidal signal including phase A and phase B which has been output from the GMR sensor 9 is amplified by the amplification circuit 21, and output to the A/D converter 33 and the binarization circuit 22. The A/D converter 33 converts phase A and phase B of the amplified sensor signal into digital data, respectively. The middle point potential of the amplified sensor signal includes individual variation due to properties of the GMR sensor 9, the amplification circuit 21, or the like. Accordingly, with the middle point potential of each of phase A and phase B being preliminarily stored in the memory 39 as an adjustment value, the cycles of phase A and phase B from the signal of the GMR sensor 9 converted into digital data are subdivided and used in the arithmetic operation process for calculating a detected pulse value of the same resolution as the driving pulse (see the multiplication process 31a in the CPU 31).

In addition, the adjustment value relating to the middle point potential is also used as a threshold voltage of the binarization circuit 22 which binarizes the amplified sensor signal. In other words, the adjustment value is set to the D/A converter 35, and respective threshold voltages of phase A and phase B are output to the binarization circuit 22. Accordingly, it is possible to obtain an ideal binarized signal with an approximately 50% duty even when there exists individual variation in the middle point potential of the amplified sensor signal, thereby allowing the up/down counter (two-phase counter) 34 to accurately count up or down.

An arithmetic processing section (CPU 31) in the microcomputer 30 performs a multiplication process (see the multiplication process 31a) which is larger than 4 times a single cycle of phase A and phase B, using the digital data including phase A and phase B taken in by the A/D converter 33, and subdivides one cycle into a resolution required for pulse management. Essentially, a detected pulse value is calculated on the basis of a phase angle obtained by the subdividing. In other words, a detected pulse value indicating a rotation position (phase angle) of the magnetic scale 8 is calculated (see pulse value calculation 31c).

However, the aforementioned process is performed, for example, at the control cycle of feedback control and therefore it becomes impossible to correctly determine the direction of change when the driving velocity of the motor becomes fast and the digital data taken in for each control cycle has exceeded half of one cycle of phase A and phase B since the previous taken-in time. Therefore, the count value of the up/down counter (two-phase counter) 34, which is always counting up or down including the direction of change of the binarized signal, is used to correctly determine the direction so as to always calculate the correct detected pulse value (see pulse value calculation 31c), even when half of one cycle of phase A and phase B has been exceeded. Actually, however, there occurs a slight gap between the timing of change of the binarized signal and the timing of change of the phase angle due to characteristic variation of the binarization circuit, an output error of the D/A converter, or the like. Such a gap may cause an error in calculation of the detected pulse value, whereby the calculated detected pulse value may instantaneously change as much as 90 degrees of the phase angle. Therefore, it is possible to always correctly calculate the detected pulse value without being affected by circuit variation or the like, by preliminarily performing an arithmetic operation to correct the count value of the up/down counter on the basis of the timing of change of the phase angle (see count value correction 31b).

As thus described, it is possible to always obtain a correct detected pulse value without being affected by the driving velocity or the control cycle of the motor, by performing a significant increase and decrease of the detected pulse value on the basis of the binarized signal and performing detailed calculation of a detected pulse value with one cycle thereof having been subdivided, from the digital data including phase A and phase B taken in by the A/D converter 33.

Figure 4:
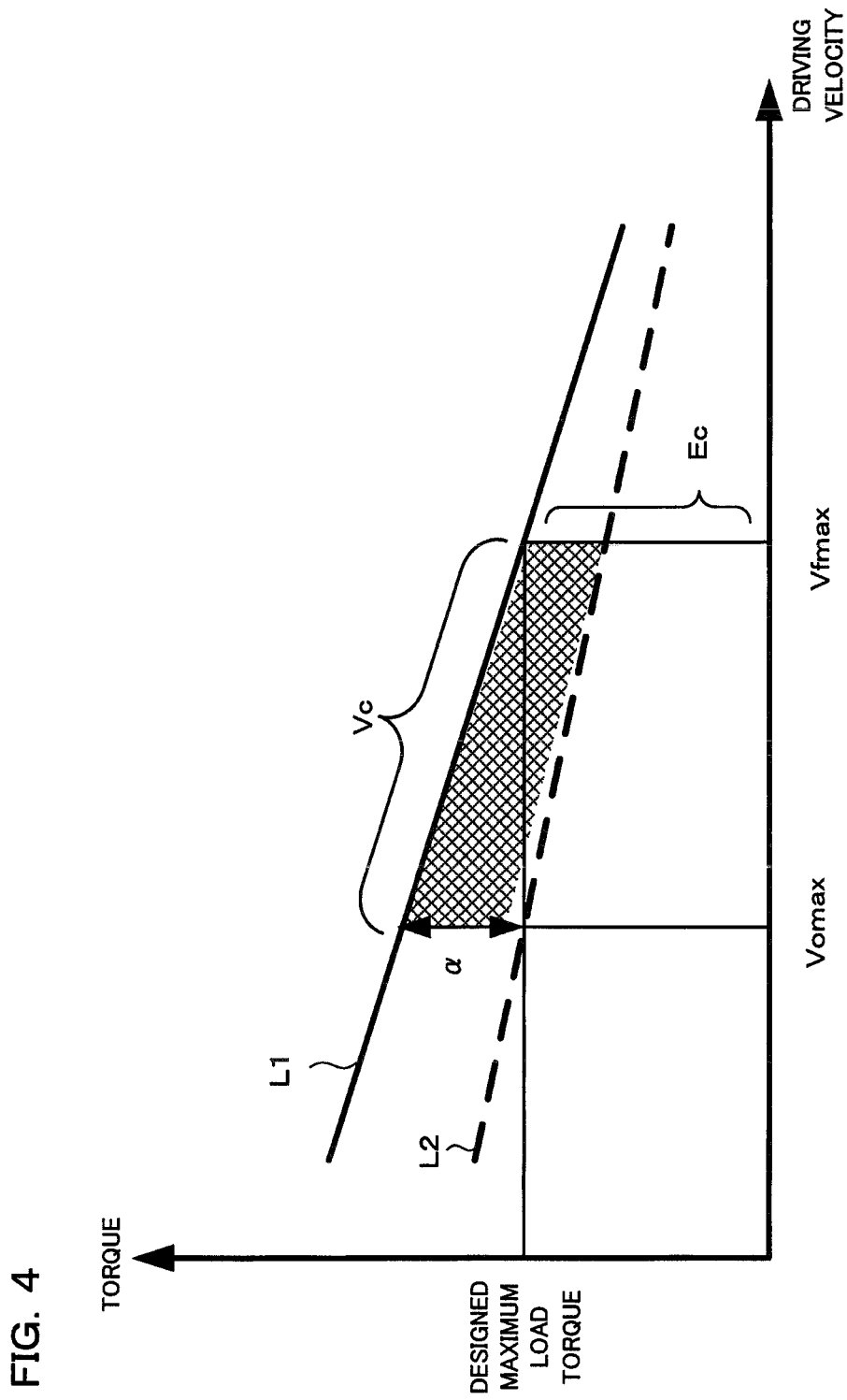
FIG. 4 is an explanatory diagram of an effect of feedback control in a camera according to an embodiment of the present invention.

Next, feedback control in the present embodiment will be described, referring to FIG. 4. In FIG. 4, a torque curve is illustrated with the horizontal axis representing the driving velocity of the stepping motor and the vertical axis representing the torque. The step-out torque property L1 expressed by a solid line indicates the limit torque within which the stepping motor 6 operates without causing step-out.

In other words, the stepping motor 6 has such a property that the torque decreases as the driving velocity increases, and a step-out phenomenon occurs when the step-out torque property falls below the load torque. Once a step-out occurs, there arises a disagreement between the amount of changing the excitation position and the amount of change of the rotation position of the motor, and therefore it becomes impossible for the stepping motor to manage the current position on the basis of the number of driving pulses whose value is increased or decreased in accordance with the amount of changing the excitation position. In order to correctly manage the current position again after the step-out, it is necessary to once perform abutting to the reference position, or perform an operation of ensuring an absolute position using a separately provided sensor. Accordingly, an upper limit of the driving velocity is determined in the open control, which is a usual stepping motor control, assuming a sufficient safety factor $\alpha$ for the designed maximum load torque.

The present embodiment therefore employs feedback control, which controls the velocity so as to prevent step-out by monitoring the amount of margin for the step-out limit in accordance with the difference between detection pulses (detected on the basis of outputs of the GMR sensor 9) detected from the rotational shaft of the stepping motor 6, and driving pulses with changed excitation positions (driving pulses applied to the stepping motor 6). Accordingly, the upper limit of velocity (see velocity control expansion range Vc of FIG. 4) may be increased by use of a safety factor.

In addition, FIG. 4 illustrates a step-out torque property when the voltage applied to the stepping motor 6 is constant. Changing the voltage being applied to the stepping motor 6 changes the step-out torque property in the vertical axis direction of FIG. 4. In the open control, the velocity is determined assuming a safety factor in the property at the maximum applicable voltage (see open control upper limit velocity Vomax of FIG. 4), in order to increase the velocity upper limit as much as possible. Accordingly, the applied voltage is fixed regardless of the load, whereby the motor consumes more power than required even when the load is light.

On the contrary, feedback control is supposed to perform voltage control when there still exists an amount of margin for the step-out limit (see voltage control range Ec of FIG. 4), such as when the actual load falls below the designed maximum load torque in a state where the velocity upper limit (see feedback control upper limit velocity Vfmax of FIG. 4) of feedback control has been reached. Accordingly, it becomes possible to reduce the applied voltage and suppress unnecessary power consumption. The same goes for a case where a velocity equal to or lower than the feedback control upper limit velocity Vfmax has been specified, such as, for example, when driving at the open control upper limit velocity Vomax, it is possible to reduce the applied voltage until the step-out torque property reaches L2 in a state where the actual load is equal to the designed maximum load torque. Since the applied voltage is feedback-controlled in accordance with load fluctuation, it is possible to prevent step-out and suppress power consumption.

Figure 5B:
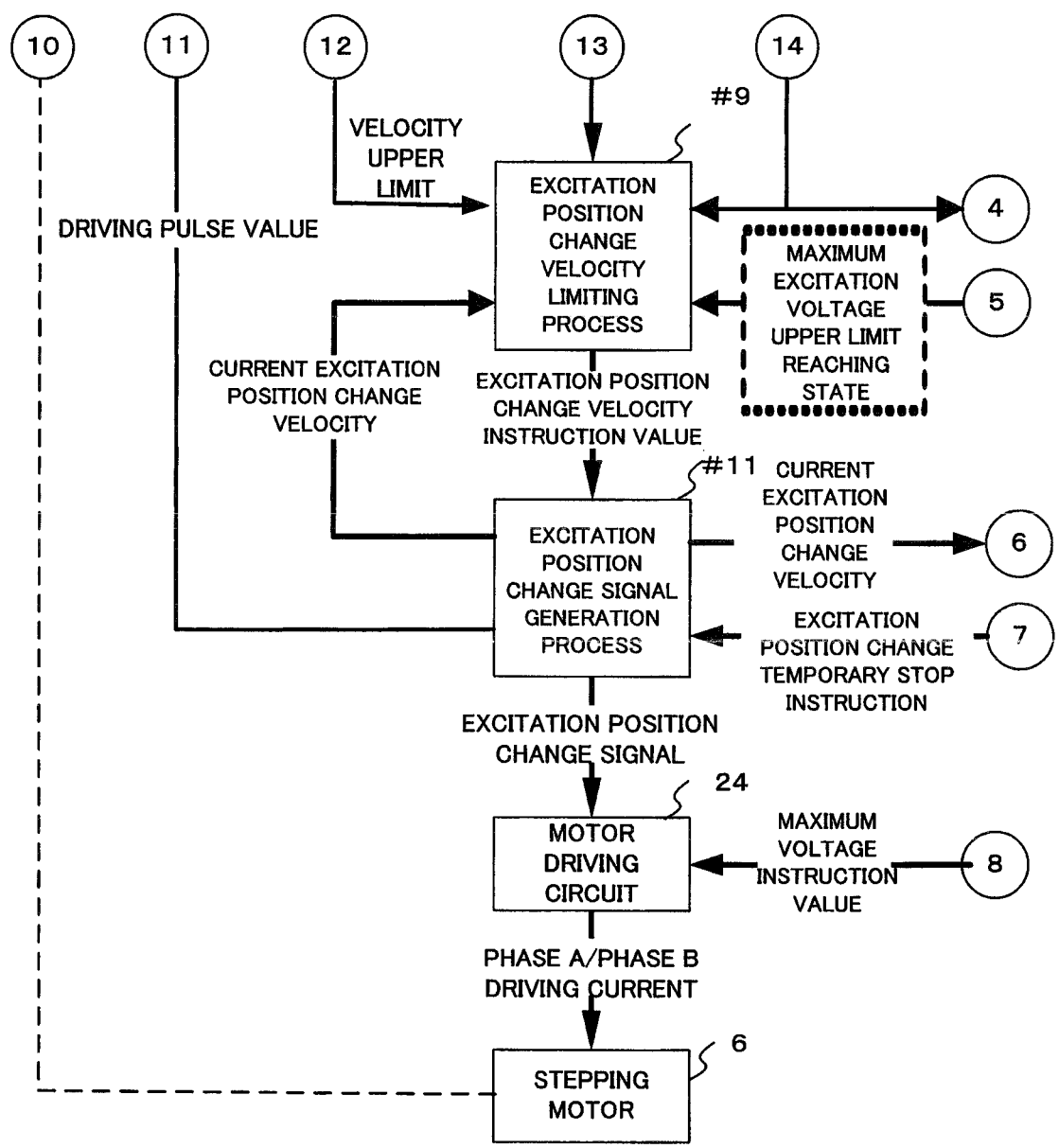
Figure 5C:
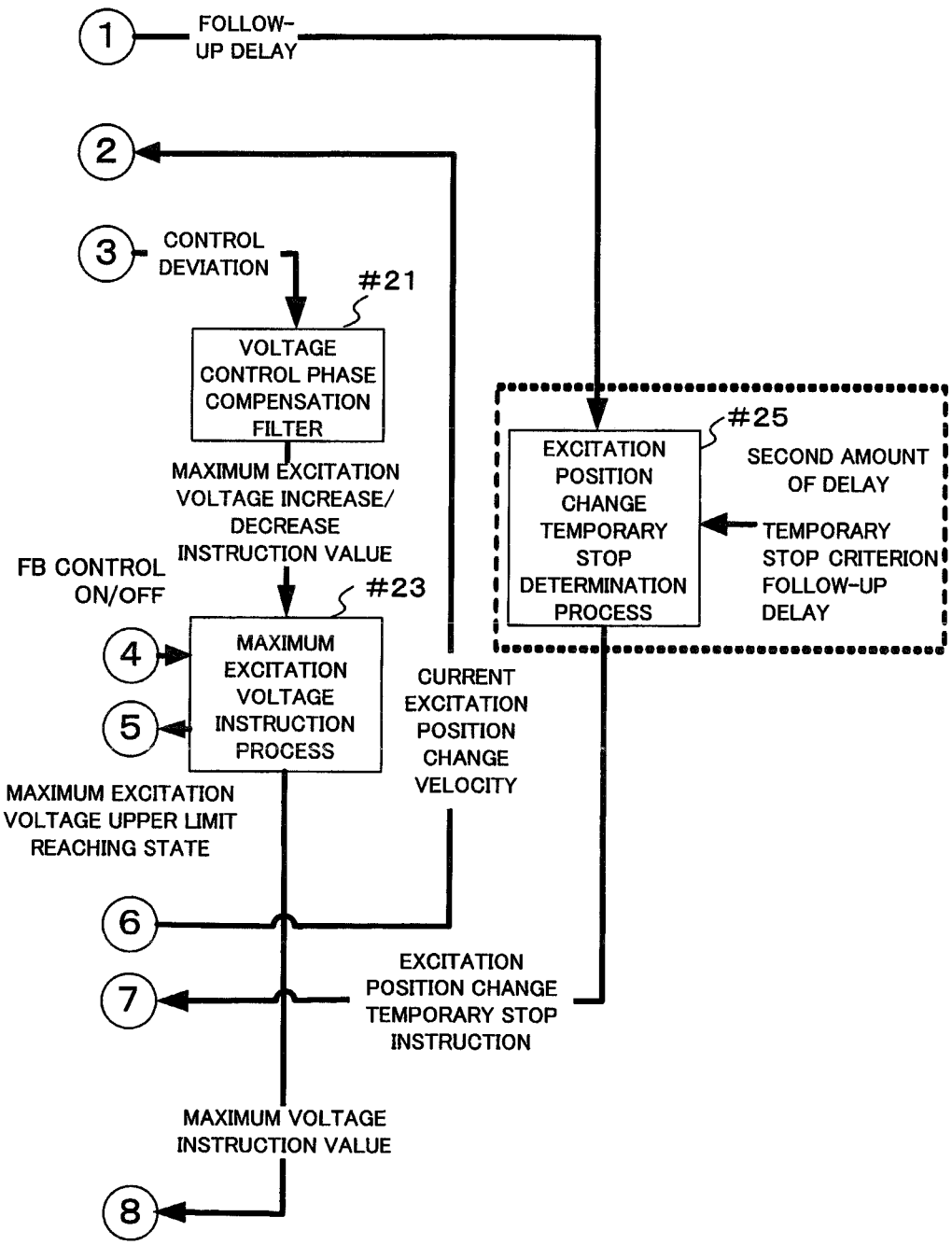

Next, a control loop in the present embodiment will be described, referring to FIGS. 5A to 5C. FIGS. 5A to 5C illustrate a process flow for each feedback control cycle, in which blocks bearing the symbol "#" except the GMR sensor 9, the motor driving circuit 24, and the stepping motor 6 are performed by the CPU 31 controlling each section in the microcomputer 30 and the camera in accordance with a program stored in the memory 39.

Figure 3:
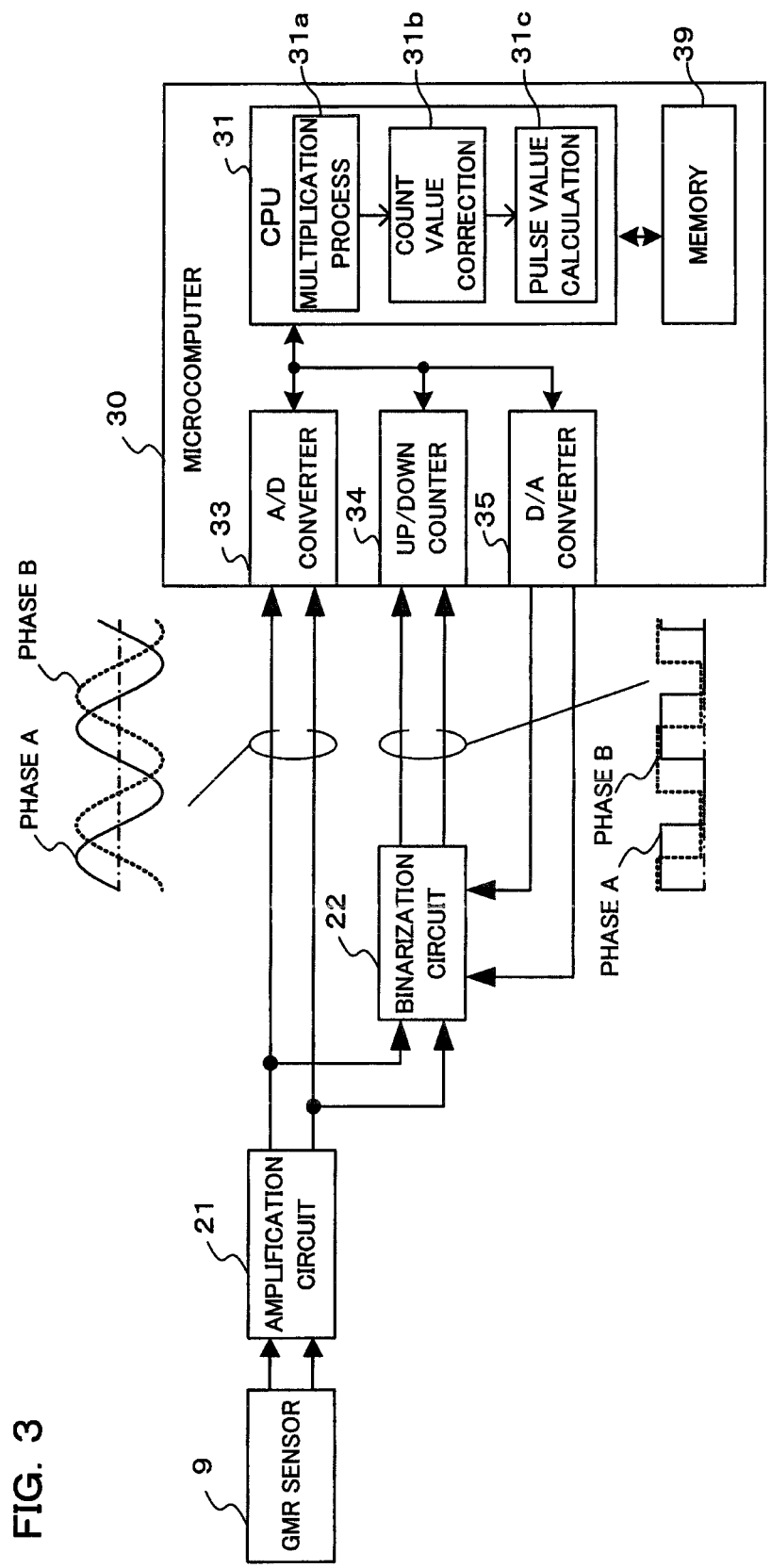
FIG. 3 is an explanatory diagram of rotation position detection signal processing of a camera according to an embodiment of the present invention.

In the control loop, a detected pulse value indicating the current position is first obtained for each control cycle by a position detection process described referring to FIG. 3, on the basis of the position detection signal (sensor output signal) from the GMR sensor 9 which is the position sensor (#1). In other words, the detected pulse value is calculated from the phase angle obtained by multiplying digital data including phase A and phase B taken in by the A/D converter 33.

Next, the amount of change of the driving pulse value at the current excitation position from the start of driving is compared with the amount of change of the detected pulse value from the start of driving, and the difference therebetween is defined as a follow-up delay (#3). Here, change management of the driving pulse value is performed simultaneously with generation of a signal for changing the current excitation position of the stepping motor 6 at #11 described below, whereby a difference between the driving pulse value and the detected pulse value calculated at #1 is obtained. The difference calculation process at #3 functions as a follow-up delay calculation section and a follow-up delay calculation step for calculating a follow-up delay on the basis of a difference between position detection information detected by the rotation detection sensor and position information (e.g., driving pulse value) instructed by the position instruction section (e.g., a process at #11 described below).

Next, a control deviation is obtained (#5), which is a difference between the follow-up delay and a first amount of delay (target follow-up delay). The first amount of delay is preliminarily stored in the memory 39 as a target amount of follow-up delay. The first amount of delay may be set as appropriate such as, for example, about half the follow-up delay that may cause step-out. Here, a difference between the follow-up delay calculated at #3 and the preset first amount of delay is calculated, and the resulting value is defined as the control deviation. Speed control and voltage control are performed on the basis of the control deviation (first usage of follow-up delay).

On the other hand, the follow-up delay is compared with a second amount of delay (temporary stop criterion follow-up delay), and excitation position change is temporarily stopped (#25 of FIG. 5C) when the follow-up delay is larger than the temporary stop criterion follow-up delay (second usage of follow-up delay). The second amount of delay may be set as appropriate such as, for example, slightly smaller than a follow-up delay that may cause step-out. The second amount of delay is a value larger than the first amount of delay.

When temporary stop determination is performed at #25, an excitation position change temporary stop instruction is transmitted to the excitation position change signal generation process at #11, whereby output of the excitation position change signal to the motor driving circuit 24 is stopped, and the stepping motor 6 is temporarily stopped. Even when the temporary stop destabilizes feedback control due to unexpected external disturbance, it becomes possible to ensure that the follow-up delay of the rotational shaft of the stepping motor 6 is recovered to a controllable range relative to the current excitation position. Release of temporary stop is determined in accordance with an elapsed time on the basis of recover from the follow-up delay and the control cycle.

The follow-up delay calculated at #3 and a current excitation position change velocity at #11 described below are input, and a process of determining whether or not to start feedback is performed (third usage of follow-up delay) (#15). When the current excitation position change velocity exceeds a feedback control lower limit velocity after start of driving, the FB start determination process #15 instructs to start feedback control ("A" and "T1" of FIG. 7, "A" and "T11" of FIG. 9). Similarly, when the absolute value or the amount of change of the follow-up delay exceeds a predetermined value, start of feedback control is instructed ("B" and "T2" of FIG. 7, "B" and "T12" of FIG. 9). The instruction to start feedback control is output to an excitation position change velocity limiting process #9 and a maximum excitation voltage instruction process #23. The feedback control lower limit velocity is a lower limit of velocity within which the velocity is changed so as not to cause step-out, when feedback control is performed.

Through two types of phase compensation filters, i.e., for velocity control and voltage control (#7 and #21), the control deviation generated at #5 turns into an excitation position change velocity increase/decrease instruction value and a maximum excitation voltage increase/decrease instruction value, respectively. The velocity control phase compensation filter (#7) and the voltage control phase compensation filter (#21) will be described below, referring to FIG. 6.

The excitation position change velocity increase/decrease instruction value processed by the velocity control phase compensation filter #7 is added to the currently set current excitation position change velocity to be a new excitation position change velocity instruction value. When feedback control is performed in the FB start determination process #15, the excitation position change velocity limiting process is performed (#9) by comparing the excitation position change velocity instruction value with the velocity upper limit.

At #9, the velocity upper limit is generated by an acceleration/deceleration pattern generation process #17. An acceleration/deceleration pattern manages acceleration control, constant velocity control, deceleration control, or the like, from the start to stop of driving. The acceleration/deceleration pattern is preliminarily stored in the memory 39. At #17, a velocity corresponding to the amount of change of the driving pulse value from the start of position driving is read as the velocity upper limit from among the acceleration/deceleration patterns stored in the memory 39.

The limit process at #9 performs a process of limiting the excitation position change velocity instruction value, when the new excitation position change velocity instruction value added to the excitation position change velocity increase/decrease instruction value generated at #7 and the currently set current excitation position change velocity has exceeded the velocity upper limit read at #17. Therefore, it is possible to perform velocity control in accordance with a predetermined velocity profile, except for a case where it has become necessary to reduce the velocity due to a growth of follow-up delay. Furthermore, excessive increase of velocity is prevented during an acceleration period or a deceleration period, thereby allowing stable acceleration/deceleration.

Note that the limit process at #9 monitors the maximum excitation voltage upper limit reaching state provided from the maximum excitation voltage instruction process #23 and, when the excitation position change velocity instruction value indicates that the current excitation position change velocity is decreasing in a state where the maximum excitation voltage has not reached the upper limit, outputs the current excitation position change velocity as a new excitation position change velocity instruction value without adding the excitation position change velocity instruction value. Adding the process particularly in acceleration prevents decrease of velocity in a state where the maximum excitation voltage has not reached the upper limit and enables to shorten the acceleration time.

In addition, although not illustrated in FIGS. 5A to 5C, there is provided a low-velocity limit on the basis of a feedback control lower limit velocity Vfmin (see FIG. 7) so that the set velocity does not decrease more than necessary during feedback control to make the control unstable.

In addition, when it is determined in the FB start determination process #15 not to start feedback control (i.e., open control is to be performed), an excitation position change velocity instruction value is output on the basis of the velocity pattern generated by the acceleration/deceleration pattern generation process at #17.

On the basis of the excitation position change velocity instruction value generated by the limit process at #9, the excitation position change signal generation process is performed and a resulting excitation position change signal is output to the motor driving circuit 24 (#11). Specifically, an edge interval of clock signals for instructing a timing to change the excitation position of the aforementioned stepping motor 6 is changed in accordance with the excitation position change velocity instruction value.

Additionally, in the excitation position change signal generation process #11, a driving pulse value is generated and output to the aforementioned difference calculation #3 and the acceleration/deceleration pattern generation process #17 described above. Furthermore, the current excitation position change velocity generated in the excitation position change signal generation process #11 is output to the FB start determination process #15.

The excitation position change velocity limiting process at #9 and the excitation position change signal generation process at #11 described above function as a position instruction section and a position instruction step for instructing a rotation position of the stepping motor. The position instruction section and the position instruction step are capable of switching between open-loop control that performs position instruction in accordance with a predetermined pattern and closed-loop control that performs position instruction on the basis of the follow-up delay, change and accelerate the velocity for advancing the position of the stepping motor on the basis of a fixed velocity pattern by the open-loop control when the lens starts moving, and transition to the closed-loop control upon the velocity corresponding to the velocity pattern reaching a predetermined value. The predetermined value described above is the lower limit of velocity that can be controlled by the closed-loop control (see, for example, the control lower limit velocity Vfmin of FIG. 7).

In addition, the position instruction section transitions to the closed-loop control in accordance with amount or change of follow-up delay, upon the velocity corresponding to the velocity pattern reaching a predetermined value (for example, the FB start determination process at #15 determines on the basis of the follow-up delay at #3). In addition, the position instruction section receives an FB-cont rol-ON instruction from the FB determination start process at #15 and transitions to the closed-loop control, upon the velocity corresponding to the velocity pattern reaching a second predetermined value corresponding to a velocity larger than the velocity corresponding to the predetermined value. Although being set equal to the upper limit velocity in the open control (see the open control upper limit velocity Vomax of FIGS. 4, 7 and 9), the second predetermined value may be equal to or lower than it.

In addition, when driving with the target velocity (see, for example, the target velocity Vob of FIG. 9) of the velocity for advancing the position of the stepping motor by the closed-loop control, the position instruction section limits, after transition to the closed-loop control, the velocity for advancing the position of the stepping motor by a fixed pattern corresponding to the upper limit of the velocity that can be controlled by the closed-loop control (see, for example, the velocity upper limit generated at #17) until the target velocity is reached. In addition, the position instruction section performs the closed-loop control on the basis of a difference between the amount of follow-up delay of the closed-loop control and the target value of the amount of follow-up delay.

On the other hand, the maximum excitation voltage increase/decrease instruction value processed and output by the voltage control phase compensation filter #21 is subject to a maximum excitation voltage instruction process, from which the maximum voltage instruction value is output (#23 of FIG. 5C). In the maximum excitation voltage instruction process here, the maximum excitation voltage increase/decrease instruction value is added to the current maximum excitation voltage setting value to become the maximum voltage instruction value when it is determined by the FB start determination process #15 that feedback control has been started. In the maximum excitation voltage instruction process, the obtained maximum voltage instruction value is set to the motor driving circuit 24 via the communication port 37 (see FIG. 1). According to this setting, the driving voltage for driving the stepping motor 6 is changed for each control cycle.

The maximum excitation voltage instruction process #23 performs a limit process on the basis of an upper limit voltage for limiting the voltage to be applied to the stepping motor 6 in accordance with temperature and a lower limit voltage for stabilizing feedback control. Note that, while feedback control is off, the maximum voltage instruction value is fixed to the upper limit voltage for limiting the voltage to be applied to the stepping motor in accordance with temperature, whereby a safety factor for step-out has been secured. Furthermore, the maximum excitation voltage instruction process #23 outputs a state indicating whether or not the current maximum voltage instruction value has reached the upper limit voltage.

As thus described, the control loop in the present embodiment detects a rotation position of the stepping motor 6 on the basis of an output signal from the GMR sensor 9, and calculates the amount of follow-up delay using the difference between detection information (detection pulse) of the rotation position and position information on the basis of a driving pulse applied to the stepping motor 6 (see #3). Using the amount of follow-up delay and the current excitation position change velocity for instructing the stepping motor 6 to change velocity, it is determined whether or not to start feedback control (#15).

In addition, the control loop controls the stepping motor 6 regardless of the output signal from the GMR sensor until it is determined in the excitation position change velocity limiting process (#9) and the excitation position change signal generation process (#11) to start feedback control by the FB start determination process at #15. In other words, driving is performed by the open control in accordance with the preliminarily set velocity pattern. In such a case, the driving torque and the driving velocity are controlled to be equal to or lower than the designed maximum load torque and the open control upper limit velocity Vomax illustrated in FIG. 4.

When, on the other hand, it is determined by the FB start determination process at #15 to start feedback control, feedback control is performed using the output signal from the GMR sensor 9. In other words, a control deviation is obtained from the amount of follow-up delay, the edge interval of clock signals to the motor driving circuit 24 is adjusted in accordance with the control deviation, whereby the driving velocity of the stepping motor 6 is adjusted (excitation position change signal generation process #11). In such a case, the control range of the driving torque and the driving velocity is expanded to be equal to or lower than the step-out torque property L1 and the feedback control upper limit velocity Vfmax illustrated in FIG. 4.

Next, a phase compensation filter will be described, referring to FIG. 6. The phase compensation filter, which is implemented as a program within the CPU, includes numerical arithmetic expressions. The phase compensation filter may include a DSP (Digital Signal Processor) integrated with, or provided separately from the microcomputer 30. The phase compensation filter is used in the velocity control phase compensation filter at #7 and the voltage control phase compensation filter at #21 in FIG. 5.

The control deviation, which is the difference between the follow-up delay and the target follow-up delay, is input to two types of phase compensation filters, i.e., for velocity control and voltage control, and output as the excitation position change velocity increase/decrease instruction value and the maximum excitation voltage increase/decrease instruction value, respectively.

The velocity control phase compensation filter includes velocity control filters 41, 42 and 47 together with an adder 45, and respective outputs of the control deviation via the velocity control filters 41 and 42 are converted into an addition value in the adder 45, and further output as the excitation position change velocity increase/decrease instruction value via the velocity control filter 47.

The voltage control phase compensation filter includes voltage control filters 43, 44 and 48 together with an adder 46, and respective outputs of the control deviation via the voltage control filters 43 and 44 are converted into an addition value in the adder 46, and further output as the maximum excitation voltage increase/decrease instruction value via the voltage control filter 48.

The velocity control filters 41, 42 and 47, and the voltage control filters 43, 44 and 48 described above, each including a two-tap FIR (Finite Impulse Response) filter and a two-tap IIR (Infinite Impulse Response) filter, are configured so that mutually-independent parameters may be set, as well as phase compensation properties and gain properties suitable for velocity control and voltage control. Since various methods are implemented as stabilization techniques of feedback control, detailed description of specific filter tuning is omitted.

Next, a velocity profile from the start to end of driving will be described, referring to FIG. 7. In FIG. 7, a velocity profile Po during open control and a profile Pf of the velocity upper limit during feedback control are illustrated, with the horizontal axis representing time and the vertical axis representing velocity.

In open control, driving is started (at time point T0) with an initial velocity Vmin which has been set with a margin for the pull-in torque of the stepping motor 6, and velocity is increased in accordance with an open control acceleration table Tai provided with a sufficient margin for the step-out. Although FIG. 7 illustrates a case of changing velocity for each predetermined pulse, an acceleration may be performed that changes the velocity smoothly against the driving time.

Upon reaching (at time point T3) the target driving velocity (open control upper limit velocity Vomax in FIG. 7), the velocity is made constant, then, in accordance with a deceleration table Tad, the velocity is reduced from a position preceding the target stop position (see time point T5) by a predetermined number of pulses, and finally the excitation phase of the stepping motor 6 is advanced to the target position where the motor driving is terminated (see time point T6). When the instructed velocity is equal to or lower than the open control upper limit velocity Vomax, the velocity is made constant at the instructed velocity after similarly having been accelerated to the instructed velocity.

It is possible to start feedback control from a time point of position "A" (time point T1) at which the driving velocity has exceeded the lower limit velocity Vfmin of feedback control. Here, when an unillustrated follow-up delay does not satisfy the predetermined condition, the control transitions to feedback control at a time point of position "B" (time point T2) at which the condition is satisfied. A velocity control range during feedback control in a case where the control has transitioned to feedback control at the time point of position "B" is illustrated in FIG. 7 with hatching. The control range is a range with the velocity setting during acceleration (profile Pf1 of FIG. 7), a constant-velocity instruction velocity Vfa (profile Pf2 of FIG. 7), and the velocity setting in the deceleration table being the upper limit, and the feedback control lower limit velocity (profile Pf3 of FIG. 7) being the lower limit.

From the time point of "B" (time point T2) satisfying the condition of feedback control, the velocity setting during acceleration is calculated in accordance with an acceleration parameter stored for feedback control. In deceleration (see time point T4), the velocity setting is lowered from a position before the target stop position by a predetermined number of pulses, in accordance with the deceleration table Tad. For example, feedback control is terminated at a time point (T5) when the velocity falls below the open control upper limit velocity Vomax. The timing of terminating feedback control may be set as appropriate in a range within the feedback control lower limit velocity Vfmin without being limited to the aforementioned example.

When the condition for transitioning to feedback control is not satisfied at time points of "A" or "B", the control forcibly transitions to feedback control at a time point of "C" at which the open control upper limit velocity Vomax has been reached. Accordingly, it is possible to prevent the time required to reach the constant-velocity instruction velocity Vfa from extending.

Figure 8A:
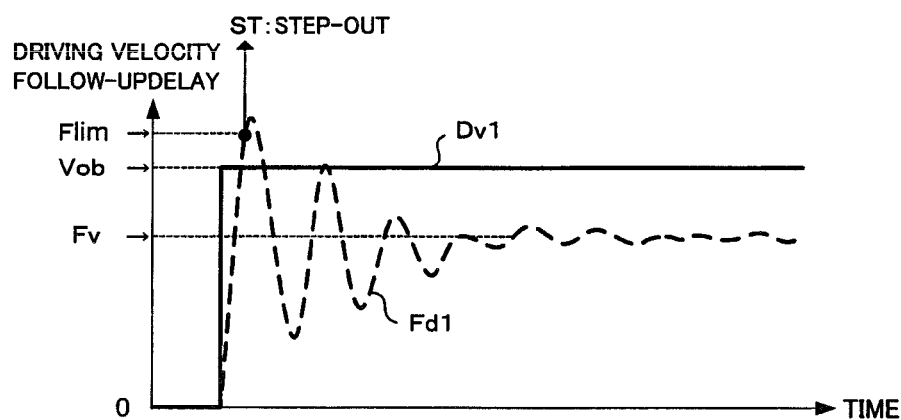
Figure 8B:
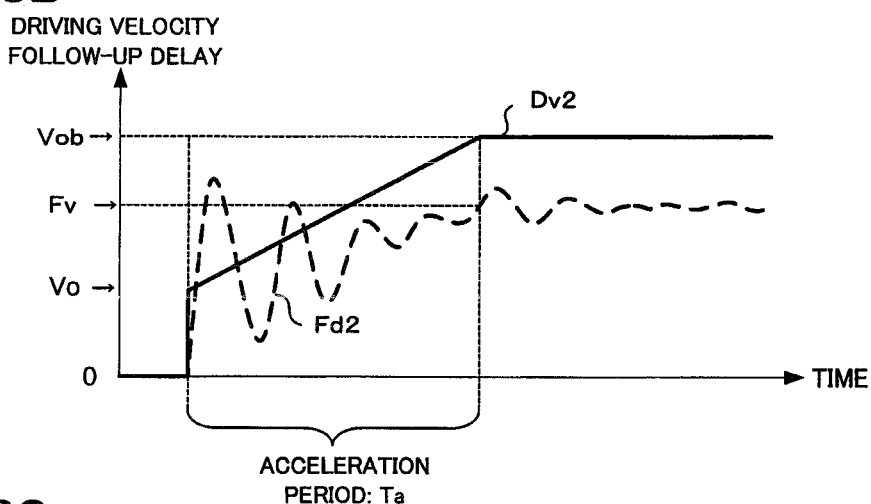
Figure 8C:
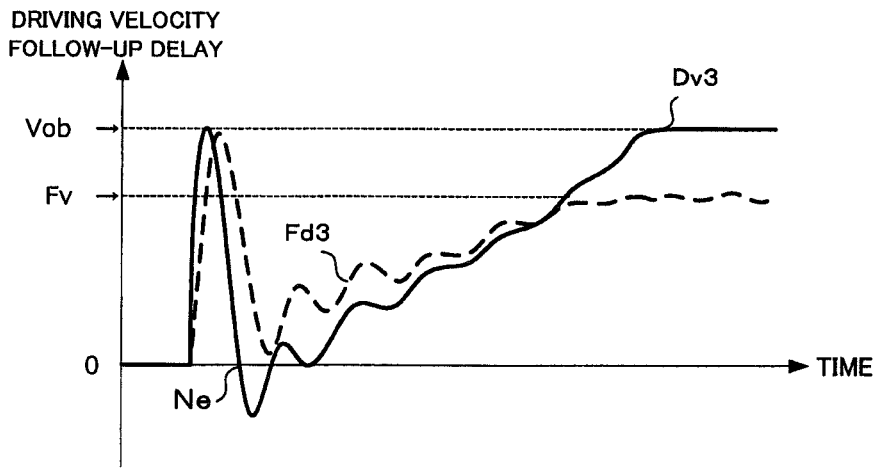

Next, an effect in the present embodiment will be described, referring to FIGS. 8A to 8C and 9. First, open control and conventional feedback control will be described, referring to FIGS. 8A to 8C. In FIGS. 8A to 8C, with the horizontal axis representing time and the vertical axis representing driving velocity and follow-up delay, Flim, Vob, and Fv along the vertical axis respectively indicate follow-up delay limit, target velocity, and follow-up delay at target velocity. In addition, the solid line indicates temporal change of the driving velocities Dv1 to Dv3, and the dashed line indicates temporal change of the follow-up delays Fd1 to Fd3.

FIG. 8A illustrates a case where the driving velocity Dv1 is instantaneously increased up to the target velocity Vob as soon as the start of driving without performing feedback control. In such a case, the follow-up delay Fd1 overshoots immediately after the start of driving, the amplitude converges while exhibiting a vibrational behavior, and finally a stable follow-up delay Fv is reached. However, when the overshoot part exceeds the follow-up delay limit due to increase of the target velocity, a step-out ST occurs even when the follow-up delay at the target velocity has a margin for the follow-up delay limit.

FIG. 8B illustrates a case where driving is started with an initial velocity Vo and the driving velocity Dv2 is gradually increased to the target velocity Vob during an acceleration period Ta without performing feedback control. In such a case, it is possible to suppress the overshoot of the follow-up delay immediately after the start of driving to be low, by setting the driving velocity immediately after the start of driving relatively low and gradually increasing the velocity up to the target velocity, and finally a stable follow-up delay Fv is reached. Accordingly, it is possible to reach the target velocity while avoiding step-out, even when the target velocity Vob is set high.

However, the control illustrated in FIG. 8B does not perform feedback control and therefore requires to take into account a sufficient safety factor for the follow-up delay limit near the target velocity, thereby making it difficult to increase the target velocity. Lack of a sufficient safety factor may cause step-out due to follow-up delay.

FIG. 8C illustrates a case of performing feedback control from the start of driving. In such a case, driving is started in a state with the target velocity Vob being set and under feedback control. At the start of driving, the driving velocity Dv3 instantaneously rises toward the target velocity Vob due to absence of follow-up delay and existence of a sufficient margin for follow-up delay at the target velocity. The follow-up delay Fd3 starts increasing at a timing slightly behind the rise of the driving velocity Dv3, and an overshoot occurs similarly to when performing constant-velocity driving (see FIG. 8A).

After occurrence of an overshoot, although the driving velocity Dv3 decreases so as to suppress the overshoot by the operation of feedback control, a gap with the timing of the follow-up delay Fd3 results in an excessive decrease of velocity. Accordingly, unless there is provided a lower limit of the driving velocity Dv3 or a limit of the driving direction, the driving may temporarily stop or there may occur a negative velocity, i.e., a reverse phenomenon as illustrated in FIG. 8C (see symbol Ne in the drawing). As thus described, performing feedback control from the start of driving may result in unstable feedback control, thereby preventing smooth and quick start of operation.

Figure 9:
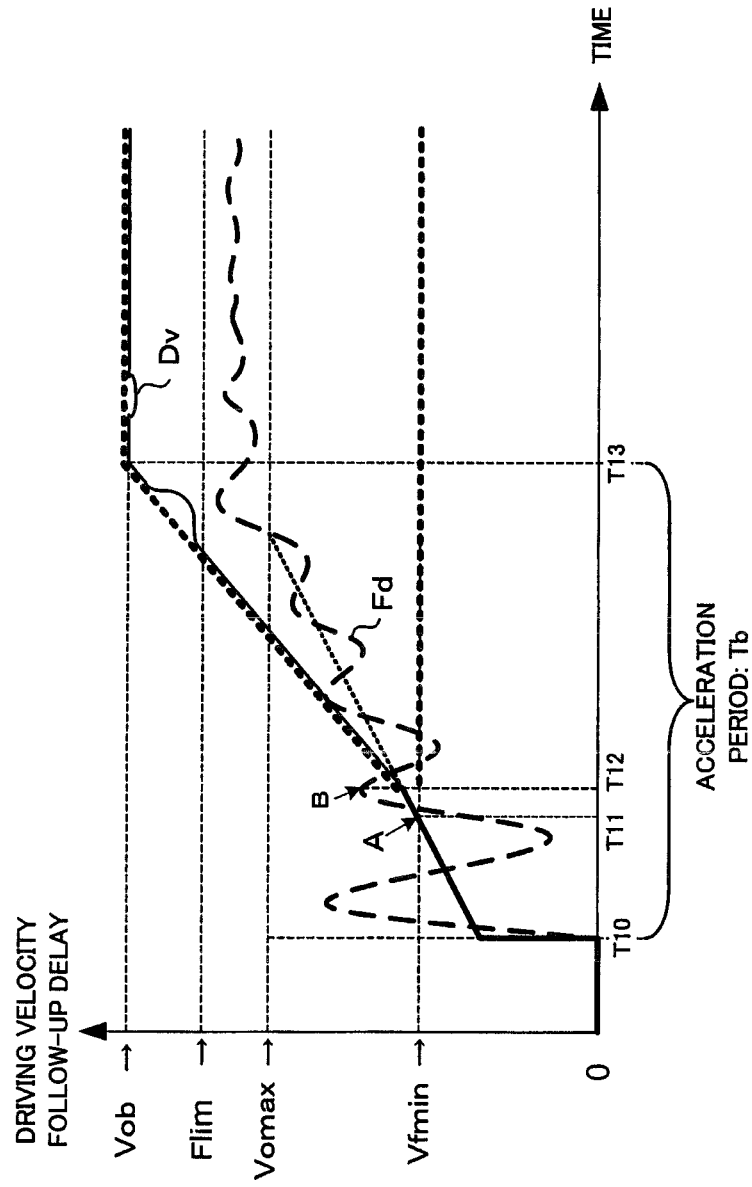
FIG. 9 is a graph illustrating a behavior with feedback control after a condition of using a fixed driving pattern at the start of driving is satisfied in a camera according to an embodiment of the present invention.

FIG. 9 illustrates feedback control in the present embodiment. In FIG. 9, with the horizontal axis representing time and the vertical axis representing driving velocity and follow-up delay, Vob, Flim, Vomax, and Vfmin along the vertical axis respectively indicate target velocity, follow-up delay limit, open control upper limit velocity, and feedback control lower limit velocity. In addition, the solid line indicates temporal change of the driving velocity Dv, and the dashed line indicates temporal change of the follow-up delay Fd.

Driving is started at time point T10, providing the same driving velocity change as with the case of performing acceleration driving by open control. Accordingly, change of follow-up delay may suppress overshoot to be low, without causing step-out. When the current excitation position change velocity exceeds the feedback control lower limit velocity Vfmin at a time point of "A" (time point T11), the velocity determination condition is satisfied (FB start determination process #15). Satisfaction of the velocity determination condition allows switching to feedback control. In such a case, it is possible to control the velocity by feedback control between the upper limit velocity limited by the acceleration pattern and the lower limit velocity Vfmin. In addition, it becomes possible to control the driving velocity Dv to avoid step-out even when external disturbance causes the follow-up delays to increase up to near the follow-up delay limit Flim.

In addition, it is possible to prevent sudden increase of follow-up delay, as well as the influence of driving voltage control which starts with the transition to feedback control, by transitioning to feedback control (FB start determination process #15) not only after satisfaction of the velocity determination condition, but also after a determination condition relating to follow-up delay has satisfied (absolute value or amount of change of follow-up delay has exceeded a predetermined value) at the time point of "B" (time point T12). Accordingly, it becomes possible to transition to feedback control in a more stable manner. The determination condition relating to follow-up delay is used for the absolute value of follow-up delay or the change state of follow-up delay. FIG. 9 illustrates an exemplary transition to feedback control when the follow-up delay tends to decrease below the feedback lower limit velocity Vfmin.

When the driving velocity Dv reaches target velocity Vob at time point T13, the acceleration period Tb expires, whereby an approximately constant driving velocity is maintained by feedback control with very few occurrence of follow-up delay.

As thus described, an embodiment of the present invention changes and accelerates (e.g., up to T10-T11, T12 of FIG. 9) the velocity for advancing the position of the stepping motor on the basis of a fixed velocity pattern by the open-loop control when the lens 2 starts moving, and transitions to the closed-loop control upon satisfaction of a predetermined condition (e.g., T11, or T12-T13 of FIG. 9). Accordingly, it is possible to prevent driving of a lens from becoming unstable when the lens starts moving.

Note that, although the GMR sensor 9 is used for detecting a rotation position in an embodiment of the present invention, any position sensor capable of detecting a position such as an optical encoder may be used, without being limited to the foregoing.

In addition, although the determination of starting feedback control (FB start determination process #15) is performed on the basis of velocity (current excitation position change velocity) and follow-up delay in an embodiment of the present invention. However, the determination may be performed on the basis of either one of the two, or other conditions, without being limited to the foregoing.

In addition, description has been provided using a digital camera as an imaging device in an embodiment of the present invention, the camera may be a digital single-lens reflex camera or a compact digital camera, or may be a camera for capturing video images such as a video camera or a movie camera, or may be a camera which is built in a mobile phone, a smartphone, a personal digital assistant, a personal computer (PC), a tablet type computer, a game device, or the like. The present invention may be applied to any device, regardless of the type, which performs driving control of a lens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens driving apparatus comprising:
a stepping motor for driving a lens;
a rotation detection sensor for detecting a rotation position of the stepping motor; and
a controller for instructing a rotation position of the stepping motor, and also calculating a follow-up delay on the basis of a difference between position detection information detected by the rotation detection sensor and information of the instructed rotation position,
wherein the controller, which is capable of switching between open-loop control that performs position instruction in accordance with a predetermined pattern and closed-loop control that performs position instruction on the basis of the follow-up delay,
changes and accelerates a velocity for advancing the position of the stepping motor on the basis of a fixed velocity pattern by the open-loop control when the lens starts moving, and
transitions to the closed-loop control upon a determination that the velocity corresponding to the velocity pattern has reached a first predetermined value, (2) a change amount of the follow-up delay has exceeded a second predetermined value, and (3) the change amount has decreased, or transitions to the closed-loop control upon the velocity corresponding to the velocity pattern reaching a third predetermined value corresponding to a velocity larger than the velocity corresponding to the first predetermined value, regardless of the change amount.

2. The lens driving apparatus according to claim 1, wherein the first predetermined value is a lower limit of a variable range of a velocity controlled by the closed-loop control.

3. The lens driving apparatus according to claim 1, wherein the third predetermined value is larger than the first predetermined value and smaller than an upper limit of a variable range of velocity controlled by the open-loop control.

4. The lens driving apparatus according to claim 1, wherein the controller sets a target velocity of the velocity for advancing a position of the stepping motor by the closed-loop control, and
after transition to the closed-loop control, limits the velocity for advancing the stepping motor by a fixed pattern corresponding to the upper limit of the velocity that can be controlled by the closed-loop control until the target velocity is reached.

5. The lens driving apparatus according to claim 1, wherein the controller performs the closed-loop control on the basis of a difference between the amount of follow-up delay of the closed-loop control and the target value of the amount of follow-up delay.

6. A lens driving method of a lens driving apparatus having a stepping motor for driving a lens and a rotation detection sensor for detecting a rotation position of the stepping motor, the method comprising:
instructing a rotation position of the stepping motor;
calculating a follow-up delay on the basis of a difference between position detection information detected by the rotation detection sensor and information of the instructed position;
allowing, when instructing the rotation position, switching between open-loop control that performs position instruction in accordance with a predetermined pattern and closed-loop control that performs position instruction on the basis of the follow-up delay;
changing and accelerating a velocity for advancing the position of the stepping motor on the basis of a fixed velocity pattern by the open-loop control when the lens starts moving; and
transitioning to the closed-loop control upon a determination that (1) the velocity corresponding to the velocity pattern has reached a first predetermined value, and (2) a change amount of the follow-up delay has exceeded a second predetermined value, and (3) the change amount has decreased, or transitioning to the closed-loop control upon the velocity corresponding to the velocity pattern reaching a third predetermined value corresponding to a velocity larger than the velocity corresponding to the first predetermined value, regardless of the change amount.

7. The lens driving method according to claim 6, wherein the first predetermined value is a lower limit of a variable range of a velocity controlled by the closed-loop control.

8. The lens driving method according to claim 6, wherein the third predetermined value is larger than the first predetermined value and smaller than an upper limit of a variable range of a velocity controlled by the open-loop control.

9. The lens driving method according to claim 6, further comprising, when instructing the rotation position, setting a target velocity of the velocity for advancing a position of the stepping motor by the closed-loop control, and after transition to the closed-loop control, limiting the velocity for advancing the position of the stepping motor by a fixed pattern corresponding to the upper limit of the velocity that can be controlled by the closed-loop control until the target velocity is reached.

10. The lens driving method according to claim 6, further comprising, when instructing the rotation position, performing the closed-loop control on the basis of a difference between the amount of follow-up delay of the closed-loop control and the target value of the amount of follow-up delay.

11. A non-transitory computer-readable medium storing a processor executable code, which when executed by at least one processor, performs a lens driving method, the lens driving method comprising:

instructing a rotation position of the stepping motor;

calculating a follow-up delay on the basis of a difference between position detection information detected by the rotation detection sensor and information of the instructed position:

allowing, when instructing the rotation position, switching between open-loop control that performs position instruction in accordance with a predetermined pattern and closed-loop control that performs position instruction on the basis of the follow-up delay;

changing and accelerating a velocity for advancing the position of the stepping motor on the basis of a fixed velocity pattern by the open-loop control when the lens starts moving; and transitioning to the closed-loop control upon a determination that (1) the velocity corresponding to the velocity pattern has reached a first predetermined value, and (2) a change amount of the follow-up delay has exceeded a second predetermined value, and (3) the change amount has decreased, or transitions to the closed-loop control upon the velocity corresponding to the velocity pattern reaching a third predetermined value corresponding to a velocity larger than the velocity corresponding to the first predetermined value, regardless of the change amount.

12. The non-transitory computer-readable medium according to claim 11, wherein the first predetermined value is a lower limit of a variable range of a velocity controlled by the closed-loop control.

13. The non-transitory computer-readable medium according to claim 11, the lens driving method further comprising, when instructing the rotation position, setting a target velocity of the velocity for advancing a position of the stepping motor by the closed-loop control, and after transition to the closed-loop control, limiting the velocity for advancing the position of the stepping motor by a fixed pattern corresponding to the upper limit of the velocity that can be controlled by the closed-loop control until the target velocity is reached.

14. The non-transitory computer-readable medium according to claim 11, the lens driving method further comprising, when instructing the rotation position, performing the closed-loop control on the basis of a difference between the amount of follow-up delay of the closed-loop control and the target value of the amount of follow-up delay.

* * * * *